(12) United States Patent  
Trojer

(10) Patent No.: US 8,917,990 B2  
(45) Date of Patent: Dec. 23, 2014

(54) FAST PROTECTION SCHEME FOR PASSIVE OPTICAL NETWORK

(71) Applicant: Telefonaktiebolaget L M Ericsson (Publ), Stockholm (SE)

(72) Inventor: Elmar Trojer, Taby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/966,407

(22) Filed: Aug. 14, 2013

(65) Prior Publication Data

US 2013/0330078 A1 Dec. 12, 2013

Related U.S. Application Data

(63) Continuation of application No. 12/933,175, filed as application No. PCT/SE2008/050294 on Mar. 17, 2008, now Pat. No. 8,538,256.

(51) Int. Cl.
| | |
|---|---|
| *H04J 14/00* | (2006.01) |
| *H04Q 11/00* | (2006.01) |
| *H04B 10/272* | (2013.01) |
| *H04J 3/14* | (2006.01) |
| *H04J 14/02* | (2006.01) |
| *H04J 3/16* | (2006.01) |
| *H04J 3/06* | (2006.01) |

(52) U.S. Cl.
CPC ........ *H04J 14/0287* (2013.01); *H04Q 11/0067* (2013.01); *H04B 10/272* (2013.01); *H04J 3/14* (2013.01); *H04J 3/1694* (2013.01); *H04Q 2011/0081* (2013.01); *H04Q 2011/0088* (2013.01); *H04J 3/0682* (2013.01)
USPC ................... 398/66; 398/67; 398/70; 398/71; 398/72

(58) Field of Classification Search
CPC . H04B 10/272; H04B 10/0775; H04J 3/0682; H04J 3/14; H04J 3/1694; H04J 14/0287; H04J 14/0204; H04J 14/0212; H04Q 11/0067; H04Q 2011/0081
USPC ......... 398/1, 2, 25, 30, 32, 35, 66, 67, 70, 71, 398/72
See application file for complete search history.

(56) References Cited

U.S. PATENT DOCUMENTS 5,357,360 A * 10/1994 Imhoff et al. ................. 398/100
7,496,040 B2 2/2009 Seo
(Continued)

OTHER PUBLICATIONS

Tanaka, K., et al.: "1:N OLT Redundant Protection Architecture in Ethernet PON System", Optical Fiber communication/National Fiber Optic Engineers Conference, 2008. OFC/NFOEC 2008. IEEE, Piscataway, NJ, USA, Feb. 24, 2008, ISBN 978-1-55752-856-8.

*Primary Examiner* — Daniel Washburn
*Assistant Examiner* — Hibret Woldekidan
(74) *Attorney, Agent, or Firm* — Roger S. Burleigh

(57) ABSTRACT

The present invention relates to a method and devices for fast protection of an optical network system, in particular for a Passive Optical Network (PON), such as a Gigabit-capable Passive Optical Network (GPON). In the method, it is detected that the communication from a first optical network device is lost. Switching of functionality is initiated from a first optical line termination device to a second optical line termination device, and a control message is sent from the second optical line termination device to the first optical network device such that the first optical network device is prevented from moving into initial state. Furthermore, the method comprises determining and setting timing settings for the first optical network device.

6 Claims, 9 Drawing Sheets

(56) References Cited

U.S. PATENT DOCUMENTS

| | | |
|---|---|---|
| 7,711,268 B2 | 5/2010 | Kazawa et al. |
| 7,835,268 B2 * | 11/2010 | Tanaka .......................... 370/216 |
| 8,081,877 B2 | 12/2011 | Duan et al. |
| 8,538,261 B2 * | 9/2013 | Johansson et al. .............. 398/58 |
| 2002/0030865 A1 * | 3/2002 | Kawate et al. ................. 359/110 |
| 2002/0109876 A1 * | 8/2002 | Eijk et al. ...................... 359/110 |
| 2004/0071469 A1 * | 4/2004 | Baldine et al. .................. 398/79 |
| 2005/0147409 A1 | 7/2005 | Colven et al. |
| 2008/0056720 A1 | 3/2008 | Sitton et al. |
| 2008/0089686 A1 * | 4/2008 | Kazawa et al. .................. 398/71 |
| 2008/0131124 A1 * | 6/2008 | Nam et al. ....................... 398/67 |
| 2009/0060496 A1 | 3/2009 | Liu et al. |
| 2009/0162064 A1 * | 6/2009 | Mizutani et al. ................ 398/66 |
| 2009/0263132 A1 * | 10/2009 | Rafel et al. ..................... 398/66 |
| 2009/0297164 A1 * | 12/2009 | Horiuchi ....................... 398/154 |
| 2010/0061729 A1 * | 3/2010 | Weeber ........................... 398/71 |
| 2011/0038629 A1 | 2/2011 | Johansson et al. |
| 2011/0044683 A1 | 2/2011 | Trojer |
| 2011/0317995 A1 * | 12/2011 | Zheng ............................... 398/2 |
| 2012/0057865 A1 | 3/2012 | Hasegawa et al. |

* cited by examiner

FAST PROTECTION SCHEME FOR PASSIVE OPTICAL NETWORK

TECHNICAL FIELD

The present invention relates to a method and devices for protection of an optical network system, in particular for a Passive Optical Network (PON), such as a Gigabit-capable Passive Optical Network (GPON).

BACKGROUND

In recent years, the requirement for data transfer capacity and reliable networks have increased. Standards, such as ITU-T G.984.1, ITU-T G.984.2, and ITU-T G.984.3, have been developed in order to increase the speed and accordingly the capacity of optical network systems.

Reliability of communication networks is an increasingly important parameter, and accordingly continuous operation of optical networks in case of breakage of fibers or malfunctioning nodes or devices is desired. The ITU-T standard specifying GPON includes four different protection switching possibilities in ITU-T G.984.1 (03/2003). These are:
Fiber duplex system (type-A scheme): Only the trunk fiber is duplex. In case of a feeder fiber break, the spare fiber can be switched in manually. Since the switching should be automated in larger networks, fiber switches are necessary which are costly and render this scheme uneconomical.
OLT-only duplex system (type-B scheme): Trunk fiber and optical line termination (OLT) line terminal (LT) are duplex. One OLT-LT is in operation, the other is in hot-standby, kicking in if the OLT-LT fails or if the trunk breaks. Optical Network Unit (ONU)/Optical Network Termination (ONT) and drop fibers are simplex. Since only the components that are shared by the users are duplex, the scheme shows a good tradeoff between costs and fault tolerance.
Full duplex system (type-C scheme): Fully failure tolerant system, since all components are duplex. The whole distribution fiber network has to be doubled, leading to very high costs for this solution.
Partial duplex system (type-D scheme): With a mix of type-B and type-C protection, simplex and duplex users can be mixed on the PON. The scheme proposed in the standard is unworkable due to the fiber-cross in the splitter.

So far, the interest in protection switching in the GPON community has been limited since typical deployment scenarios support a maximum of 64 split on 20 km reach, i.e. the protection benefits are small compared to the costs of the schemes. However, with the development of reach-extended systems with higher splits (128 to 256) protection will become an essential part of the PON system, since a trunk fiber cut or OLT failure will cause service outage for a high number of users.

Considering a type-B scheme, switch-over based on the standard procedure as proposed in the standard will take several minutes to occur since all ONUs/ONTs move to initial state where a full initialization including configuration, activation and ranging is necessary. Thus such schemes cannot recover quickly and connection or session continuity cannot be accomplished.

SUMMARY

Accordingly, it is an object of the present invention to provide a method and devices for minimizing downtime of a PON in case of fiber fault or device failure in the network.

A method for protecting an optical network system is provided. The optical network system comprises a first optical network device, an optical distribution network, and a first and second optical line termination device, wherein the first optical network device communicates with the first optical line termination device on a first connection via the optical distribution network and a first optical fiber trunk connected to the first optical line termination device. Further, the first optical network device has a second connection to the second optical line termination device via the optical distribution network and a second optical fiber trunk connected to the second optical line termination device. In the method, it is detected that the communication from the first optical network device is lost. Switching of functionality is initiated from the first optical line termination device to the second optical line termination device, and a control message is sent from the second optical line termination device to the first optical network device such that the first optical network device is prevented from moving into initial state. Furthermore, the method comprises determining and setting timing settings for the first optical network device.

Furthermore, an optical line termination device for an optical network system comprising a first optical network device and an optical distribution network is provided. The optical line termination device comprises an optical fiber trunk interface and being adapted to communicate with the first optical network device on a connection via the optical distribution network and an optical fiber trunk. Additionally, the optical line termination device comprises a controller device connected to the optical fiber trunk interface and being adapted to detect that the communication from the first optical network device is lost. When the optical line termination device detects that communication is lost, the optical line termination device is adapted to initiate switching of functionality from another optical line termination device to the optical line termination device and send a control message to the first optical network device such that the first optical network device is prevented from moving into initial state. Furthermore, the optical line termination device is adapted to determine and set timing settings for the first optical network device.

It is an important advantage of the present invention that an optical network device is prevented from moving into initial state when the first optical fiber trunk and/or the first optical line termination device fail or break down. Hereby, the downtime of the optical network system is reduced considerably by avoiding complete re-initialization of the optical network devices that are hosted by or connected to the first optical line termination device.

An optical line termination system is provided, comprising a first optical line termination device and a second optical line termination device. The second optical line termination device is an optical line termination device as described herein.

It is an important advantage of the present invention that session and/or connection continuity is provided or maintained in a PON, such as a GPON, in case of fiber fault of the duplex fiber or failure of duplex network components, such as an OLT.

BRIEF DESCRIPTION OF THE DRAWINGS

The above and other features and advantages of the present invention will become readily apparent to those skilled in the art by the following detailed description thereof, in particular by detailed description of exemplary embodiments thereof with reference to the accompanying drawings, in which.

DETAILED DESCRIPTION

Figure 1:
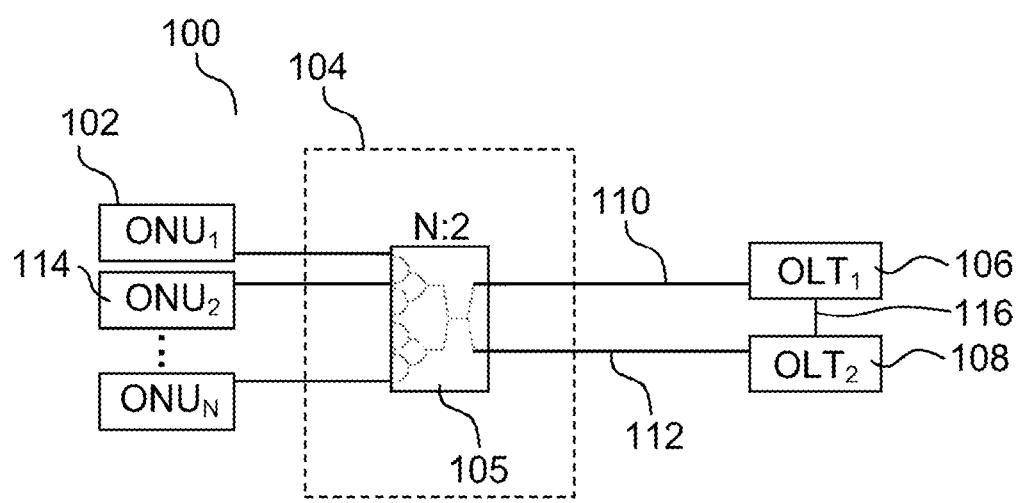
FIG. 1 schematically illustrates an optical network system employing the method according to the present invention, FIG. 2 schematically shows a block diagram of an embodiment of an optical line termination device according to the present invention, FIG. 3 schematically shows a block diagram of another embodiment of an optical line termination device according to the present invention.

The figures are schematic and simplified for clarity, and they merely show details which are essential to the understanding of the invention, while other details have been left out. Throughout, the same reference numerals are used for identical or corresponding parts or features.

FIG. 1 illustrates an optical network system 100 implementing the method according to the present invention. The optical network system operates in a type-B protection scheme scenario as described in ITU-T G.984.1 and comprises a first optical network device ($ONU_1$) 102, an optical distribution network 104 comprising a splitter 105, a first optical line termination device ($OLT_1$) 106 and second optical line termination device ($OLT_2$) 108. The first optical network device 102 communicates with the first optical line termination device 106 on a first connection via the optical distribution network 104 and a first optical fiber trunk 110 connected to the first optical line termination device 106. Furthermore, the first optical network device 102 has a second connection to the second optical line termination device 108 via the optical distribution network 104 and a second optical fiber trunk 112 connected to the second optical line termination device 108. $OLT_1$ communicates with $OLT_2$ on a first control connection 116. The first control connection may be an electrical and/or optical connection. The first control connection may be wireless.

The first optical line termination device 106 and the second optical line termination device 108 are configured in a duplex configuration and is connected to a number N of optical network devices ($ONU_1$, $ONU_2$, ..., $ONU_N$). Typically, $N=2^p$, where p equals 0, 1, 2, 3, 4, 5, 6, 7, 8, 9, 10 corresponding to N equal to 1, 2, 4, 8, 16, 32, 64, 128, 256, 512, 1024. A higher number of optical network devices may be contemplated.

The splitter 105 comprises N ONU drop ports towards the N optical network devices and two trunk ports connected to $OLT_1$ and $OLT_2$, respectively.

In regular operation of the optical network system 100, $OLT_1$ is active and serves the optical network devices $ONU_1$, $ONU_2$, ..., $ONU_N$. The second optical line termination device $OLT_2$ is in hot standby, i.e. listens to upstream traffic on the second connection (second optical fiber trunk 112).

In case $OLT_1$ or the first optical fiber trunk 110 fails, the communication between $OLT_1$ and $ONU_1$-$ONU_N$ will stop immediately, which will be detected immediately by all active ONUs. $OLT_2$ is adapted to detect that communication from one or more optical network devices is not present or lost. In an embodiment, the lost communication is interpreted as a failure or fault in $OLT_1$ or in the first optical fiber trunk 110 and switching of functionality from $OLT_1$ to $OLT_2$ is initiated. $OLT_2$ immediately, e.g. within 50 milliseconds from detection of communication loss, sends a control message, e.g. a broadcast POPUP message, to all ONUs in order to prevent ONUs to enter init state. Bringing ONUs back to operating state from the init state is time consuming and should therefore be avoided. In general, it is important that the ONUs receive the control message before expiry of timer T2 (100 ms). Subsequently, the ONUs are ranged by the second optical line termination device $OLT_2$.

As mentioned above, an optical line termination device for an optical network system is provided. In accordance with the method, the optical line termination device may be adapted to determine the cause of communication loss from the first optical network device and initiate switching of functionality from the other optical line termination device based on the determined cause of communication loss.

The optical line termination device according to the invention may comprise a first interface connected to the controller device. The first interface may be connected to the other optical line termination device, e.g. the first optical line termination device, via a first control connection. Hereby, the optical line termination device may be adapted to exchange information with the other optical line termination device. The exchanged information may comprise status information about the other optical line termination device and/or the optical fiber trunk connected to the other optical line termination device.

In order to secure information exchange with the other optical line termination device, the control connection may be duplex. Accordingly, the optical line termination device may comprise a second interface connected to the controller device and may be adapted to exchange information with the other optical line termination device via the second interface on a second control connection in case of failure of the first control connection.

The optical line termination device may be adapted to send a control message to and determine and set timing settings for each or selected ones of the optical network devices connected to the optical line termination device. Accordingly, the optical line termination device may be adapted to send a control message to a second optical network device in the optical network system and determine and set timing settings for the second optical network device.

The optical line termination device may, e.g. when implemented or adapted for a PON according to ITU-T G.984.1, ITU-T G.984.2, and/or ITU-T G.984.3, be adapted to send a control message comprising a broadcast POPUP message to the optical network devices connected to the optical line termination device.

Determination and setting of timing settings for the optical network devices connected to the optical line termination device according to the invention may be implemented in a number of ways. In an embodiment, the optical line termination device may be adapted to send a ranging request message to the first optical network device and adapted to receive a ranging response message from the first optical network device.

The optical line termination device may be adapted to sent the ranging request message to one or more, e.g. only one or each, of the optical network devices, e.g. to the first and/or second optical network device, connected to the second optical line termination device. In an embodiment of the present invention, the ranging request message is sent to each of the optical network devices connected to the second optical line termination device.

The optical line termination device may be adapted to retrieve the second set of timing settings for the optical network devices including timing setting for the first and/or second optical network device from a data storage, e.g. a data storage in the optical line termination device. Alternatively or in combination, the second set of timing settings or a part of the second set of timing settings may be calculated. For example, timing settings for an optical network device, e.g. the first optical network device, may be measured and the new (second set of) timing settings for the remaining optical network devices may be calculated based on the performed measurement and the first set of timing settings, e.g. retrieved from a data storage.

The optical line termination device may be adapted to set the timing settings, e.g. including equalization delay, by sending a ranging time message. The ranging time message may be a broadcast ranging time message comprising a list of timing settings for the optical network devices connected to the optical line termination device.

The optical network device may be an Optical Network Unit (ONU) or and Optical Network Termination (ONT), e.g. in accordance with ITU-T G.984.3. The optical line termination device may be implemented in Optical Line Termination (OLT) e.g. in accordance with ITU-T G.984.3, or an Optical Line Termination (OLT) Line Terminal (LT).

The optical line termination device(s) may comprise a core interface towards the backplane network.

Figure 2:
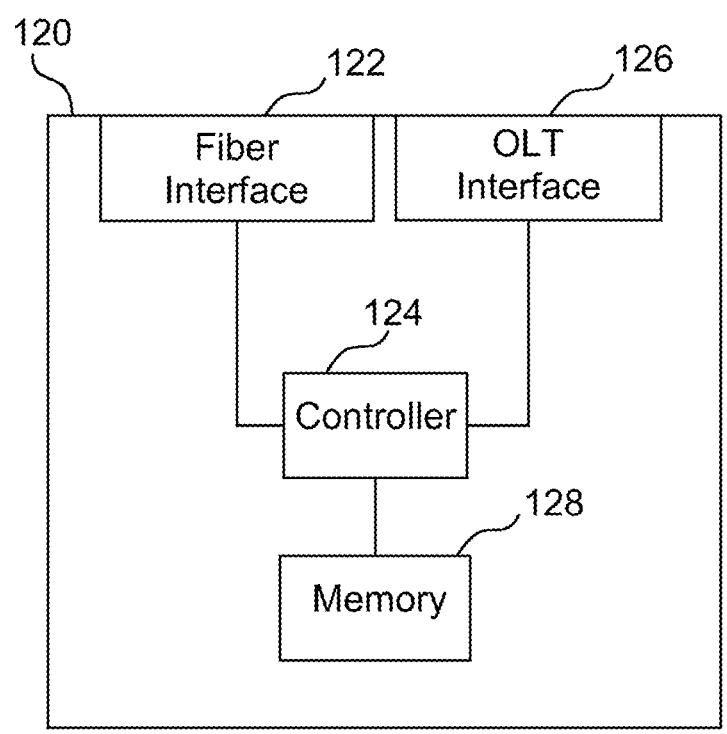

FIG. 2 illustrates an embodiment of the optical line termination device according to the present invention. The optical line termination device 120 comprises a fiber interface 122, e.g. an optical fiber trunk interface, a controller 124, a first interface 126 for exchanging information with another optical line termination device, e.g. on the first control connection 116, and a memory or data storage 128. The optical line termination device 120, e.g. implemented in the second optical line termination device 108, is adapted to detect that the communication from one or more of the optical network devices, e.g. the first optical network device is lost and initiate switching of functionality from another optical line termination device, e.g. the first optical line termination device 106, to the optical line termination device 120. Further, the optical line termination device 120 is adapted to send a broadcast POPUP message to the first optical network device and determine and set timing settings for the first optical network device, e.g. as described in connection with FIG. 7 and FIG. 8. Further, the optical line termination device 120 may be adapted to store network data such as round trip delays or other configuration data from another optical line termination device, e.g. $OLT_1$ 106, in the memory 128. The memory 128 may be updated continuously, or with a certain frequency, via the first interface 126 and/or the second interface 130 with data from the other or first, optical line termination device in order to facilitate a fast switchover of functionality.

The condition of upstream silence on the optical line termination device 108, 120 may not be sufficient to declare that the other optical line termination device, e.g. $OLT_1$, or the first optical fiber trunk has failed. It is also possible that the system has been put out of operation or that ONUs are just silent for some time. In order to avoid unnecessary switching of functionality, the optical line termination device 120 is adapted to determine the cause of communication loss from the first optical network device and initiate switching of functionality from the other optical line termination device based on the determined cause of communication loss. The cause of communication loss may be determined by detecting a status signal from the other, i.e. first, optical line termination device on the first control connection. In case the status signal is absent, switching is initiated, control message is sent, and timing settings are determined and set accordingly.

Figure 3:
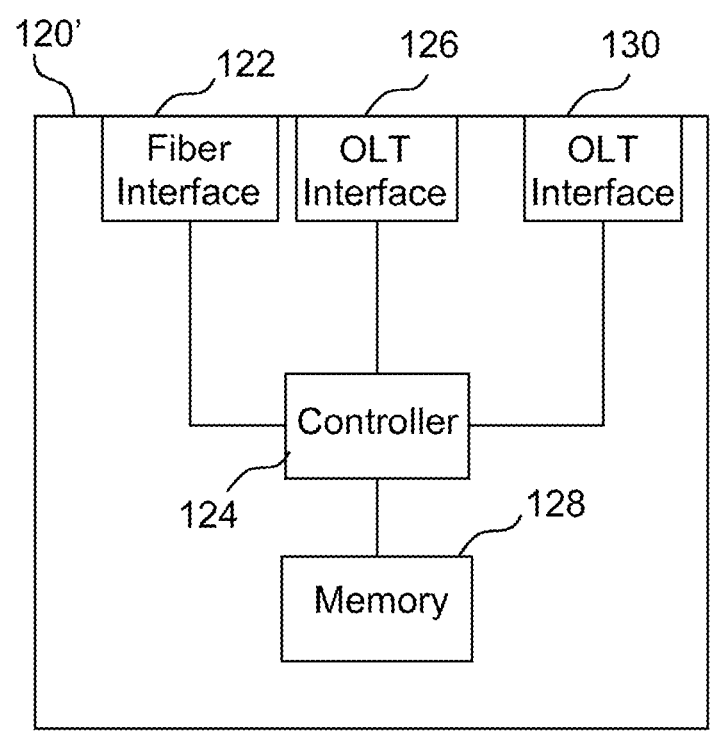

FIG. 3 illustrates an embodiment of the optical line termination device 120' further having a second interface 130 for a second control connection to the other optical line termination device. The optical line termination device is adapted to exchange information with the other optical line termination device, e.g. $OLT_1$, via the second interface 130 in case of failure of the first control connection.

Figure 4:
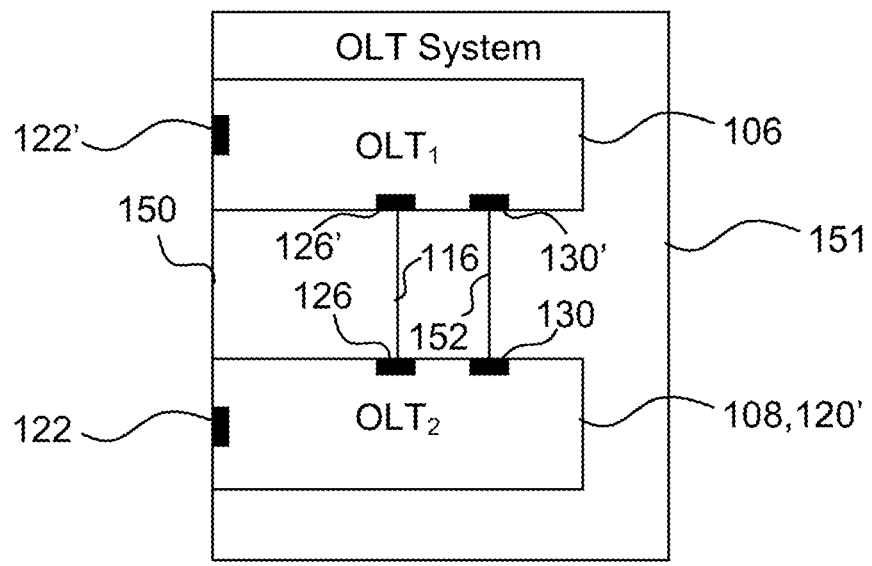
FIGS. 4-6 show different embodiments of an optical line termination system according to the invention, FIG. 7 schematically shows a flow diagram of an embodiment of the method according to the present invention, FIG. 8 schematically shows a flow diagram of an embodiment of the method according to the present invention, FIG. 9 schematically illustrates a flow diagram of an embodiment of selected steps of the method according to the present invention, and FIG. 10 schematically illustrates a flow diagram of an embodiment of selected steps of the method according to the present invention.

FIG. 4 illustrates an embodiment of an optical line termination system according to the invention. The optical line termination system 150 has a housing 151 comprises a first optical line termination device 106 and a second optical line termination device 120'. The first and second optical line termination devices 106, 120' have first and second fiber interfaces 122' and 122, respectively, first interfaces 126 and 126', respectively, and second interfaces 130 and 130', respectively. The interfaces 126, 126', 130, 130' and corresponding first and second control connections 116, 152 allow $OLT_2$ to determine cause of communication loss. Further, $OLT_2$ may be adapted to mirror network related data (GPON and service definitions) from $OLT_1$ or vice versa, which may be important in order to perform switch over without loosing the communication sessions in the optical network system.

Figure 5:
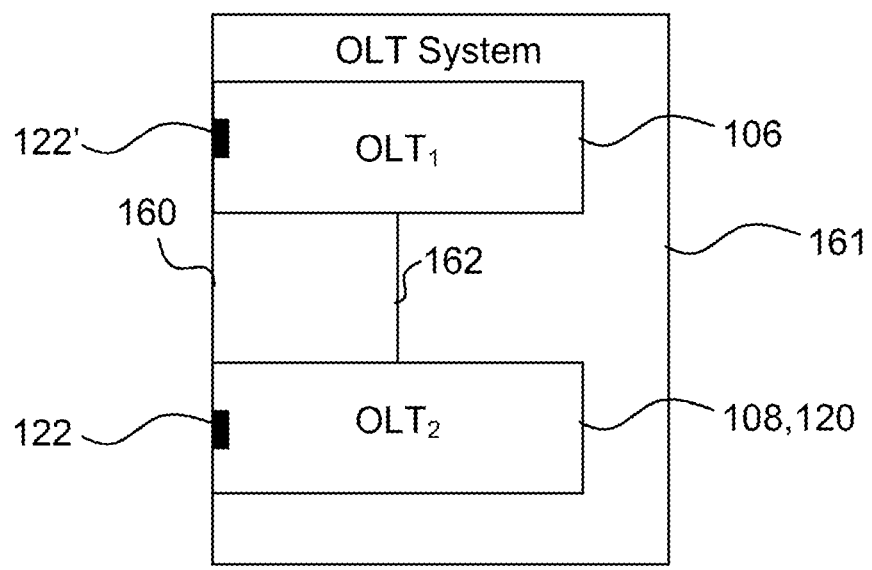

FIG. 5 illustrates an embodiment of an optical line termination system according to the invention. The optical line termination system 160 is implemented in an Application Specific Integrated Circuit (ASIC) or in a Field-Programmable Gate Array (FPGA) on a silicon board 161 and comprises a first optical line termination device ($OLT_1$) 106 and a second optical line termination device ($OLT_2$) 120. The first and second optical line termination devices 106, 120 have first and second optical fiber trunk interfaces 122' and 122, respectively. $OLT_2$ is adapted to mirror network related data (GPON and service definitions) from $OLT_1$ or vice versa via bus 162 which may be important in order to perform switch over without loosing the communication sessions in the optical network system. $OLT_1$ and $OLT_2$ may have shared data storage or separate data storages.

The implementation of the optical line termination system illustrated in FIGS. 4 and 5 may be referred to as type B protection scheme with single homing.

Figure 6:
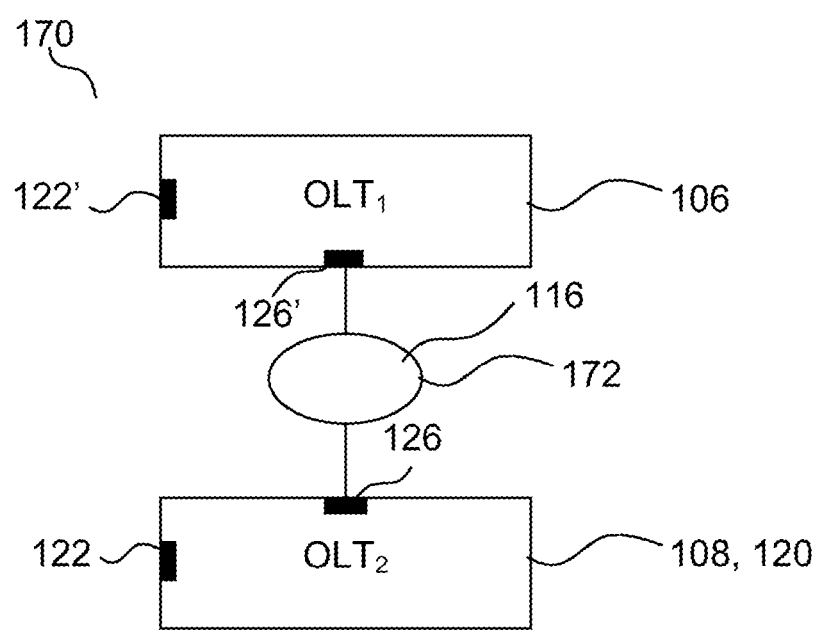

FIG. 6 illustrates an embodiment of an optical line termination system according to the invention. The optical line termination system 170 comprises a first optical line termination device ($OLT_1$) 106 and a second optical line termination device ($OLT_2$) 120.

The first 106 and second 108, 120 optical line termination devices have first and second optical fiber trunk interfaces 122' and 122, respectively. The first control connection 116 comprises an external communication link 172, e.g. via a Local Area Network (LAN), between $OLT_1$ and $OLT_2$, which are positioned in different locations. This type of protection may be referred to as type B protection with dual homing.

Figure 7:
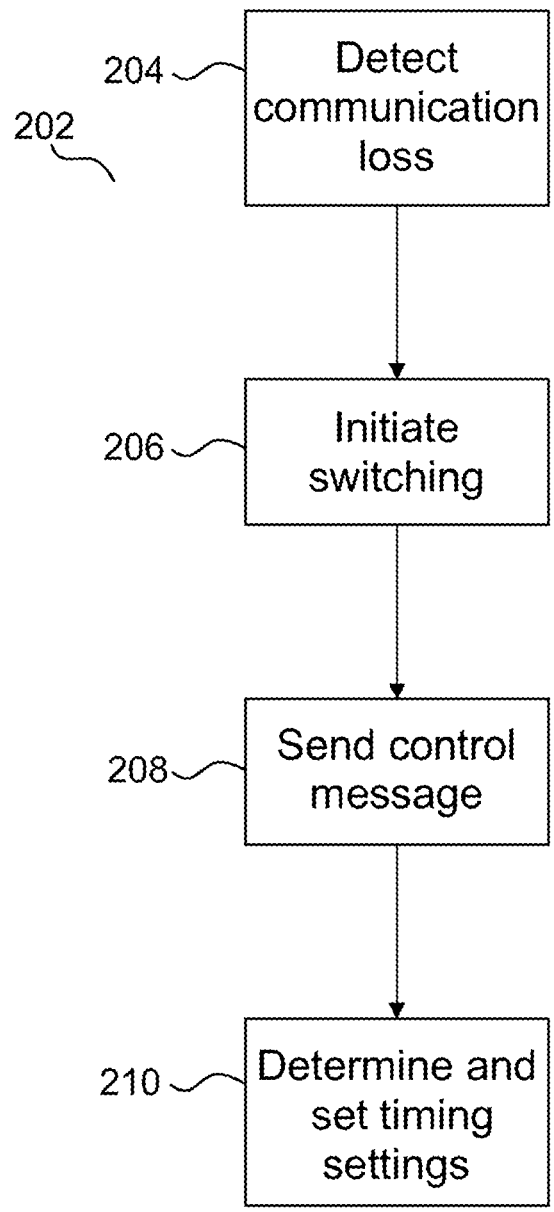

FIG. 7 is a schematic flow diagram illustrating an embodiment of the method according to the invention. The method may be implemented in an optical network system 100 illustrated in FIG. 1. In the method 202, it is detected in step 204 that the communication from the first optical network device is lost. The method 202 then proceeds to step 206 of initiating switching of functionality from the first optical line termination device 106 to the second optical line termination device 108. Subsequently, the method proceeds to step 208 of sending a control message in the form of a POPUP broadcast message from the second optical line termination device 108 to the first optical network device 102. By sending a control message to the first optical network device, the first optical network device is prevented from moving into init state thereby saving valuable time for re-initialization of the PON. After sending the control message in step 208, the method proceeds to step 210 of determining and setting timing settings for the first optical network device. The round trip delay for the first line termination device and the second line termination device are different. The difference in round trip delay is caused by a difference in trunk delay $d_1$ for the first optical fiber trunk, and trunk delay $d_2$ for the second optical fiber trunk.

In the method according to the invention, the step of sending a control message may comprise sending any control message that prevents the optical network devices, such as optical network units or optical network terminals, to move into initial state. Preferably, the step of sending a control message comprises sending a broadcast POPUP message. In a GPON, it is important that the broadcast POPUP message reaches the optical network devices before they move into initial state, i.e. before timer T2 expiry (100 ms).

The change in delay is important, since ONUs need to time their upstream bursts in such a way that all burst are received aligned at the OLT without temporal overlap (no collision). The OLTs are granting timeslots for upstream transmission to the ONUs. In case $OLT_2$ takes over, the only thing that changes is the trunk delay. In case the equalization delay $EqD_1(n)$ for $OLT_1$ is replaced by the equalization delay $EqD_2(n)$ for $OLT_2$ in the equalization delay memory of each $ONU_n$ (n=1, 2, ..., N), the optical network system can be brought back into operation without loosing the whole optical network configuration.

Step 210 of determining and setting timing settings will be described in more detail with reference to the embodiments of steps 208 and 210 illustrated in FIGS. 9 and 10.

It may be desired to avoid unnecessary switching of functionality from the first optical line termination device to the second optical line termination device, e.g. in case the loss of communication is caused by an outage or failure in the optical distribution network or other parts of the system. Accordingly, the method according to the present invention may comprise determining the cause of communication loss from the first optical network device and initiate switching of functionality based on the determined cause of communication loss. In an embodiment switching may be initiated according to a switching scheme, e.g. only in case of failure or breakdown of the first optical fiber trunk and/or the first optical line termination device.

In an embodiment of the present invention, initiating switching of functionality comprises exchanging information between the first optical line termination device and the second optical line termination device on a first control connection, e.g. via a first interface in each of the optical line termination devices. Information between the first optical line termination device and the second optical line termination device may be exchanged on a second control connection in case of failure of the first control connection, i.e. the control connection may be duplex. The information may comprise timing settings, such as equalization delays for optical network devices connected to the first and second optical line termination device.

The optical network system may comprise a second optical network device communicating with the first optical line termination device and the second optical line termination device via the optical distribution network and the first and second optical fiber trunks, respectively. In that case, the method may further comprise sending a control message from the second optical line termination device to the second optical network device and determining and setting timing settings for the second optical network device.

The timing settings for the optical network devices, e.g. the equalization delay settings for the optical network devices connected to the first and second line termination devices, are often dependent on which optical line termination device is in operation, i.e. a first set of timing settings applies to the optical network devices when the first optical line termination device is in control and a second set of timing settings applies to the optical network devices when the second optical line termination device is in control.

In case the second optical line termination device takes over, the timing settings of the optical network devices must be adjusted to the new operation scheme. The timing settings, e.g. the second set of timing settings, may be determined by sending, e.g. from the second optical line termination device, a ranging request message and receiving a ranging response message, e.g. from the first optical network device.

The ranging request message may be sent to one or more of the optical network devices, e.g. to the first and/or second optical network device, connected to the second optical line termination device. In an embodiment of the present invention, the ranging request message is sent to each of the optical network devices connected to the second optical line termination device.

In an embodiment of the present invention, the second set of timing settings for the optical network devices including timing setting, e.g. equalization delay, for the first and/or second optical network device may be partly or fully retrieved from a data storage. Alternatively or in combination, the timing settings or a part of the timing settings may be calculated, e.g. timing settings for an optical network device may be measured and the new (second set of) timing settings for the remaining optical network devices may be calculated based on the performed measurement and the first set of timing settings that may be retrieved from a memory, e.g. in the second line termination device.

The timing settings may be set by sending a ranging time message. The ranging time message may be a broadcast ranging time message comprising a list of timing settings for the optical network devices.

Figure 8:
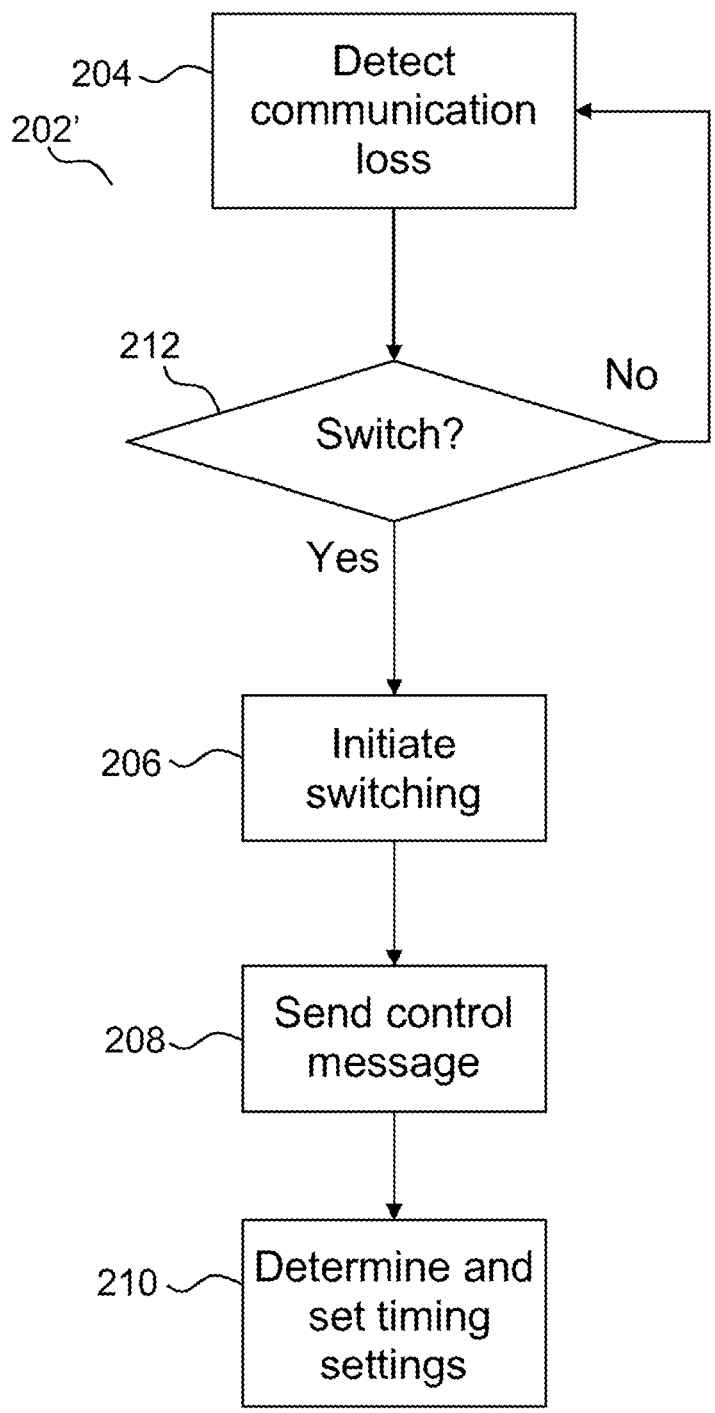

FIG. 8 is a schematic flow diagram illustrating an embodiment of the method according to the invention. The method 202' may be implemented in a optical network system 100 illustrated in FIG. 1. In addition to the steps 204, 206, 208 and 210 which are described in connection with FIG. 7, the method 202' comprises the step 212 of determining, after step 204 of detecting loss of communication, if switching is to be initiated. The decision in step 212 comprises determining the cause of communication loss, i.e. whether $OLT_1$ or the first optical fiber trunk has failed. In case $OLT_1$ or the first optical fiber trunk has failed, the method 202' proceeds to step 206.

Figure 9:
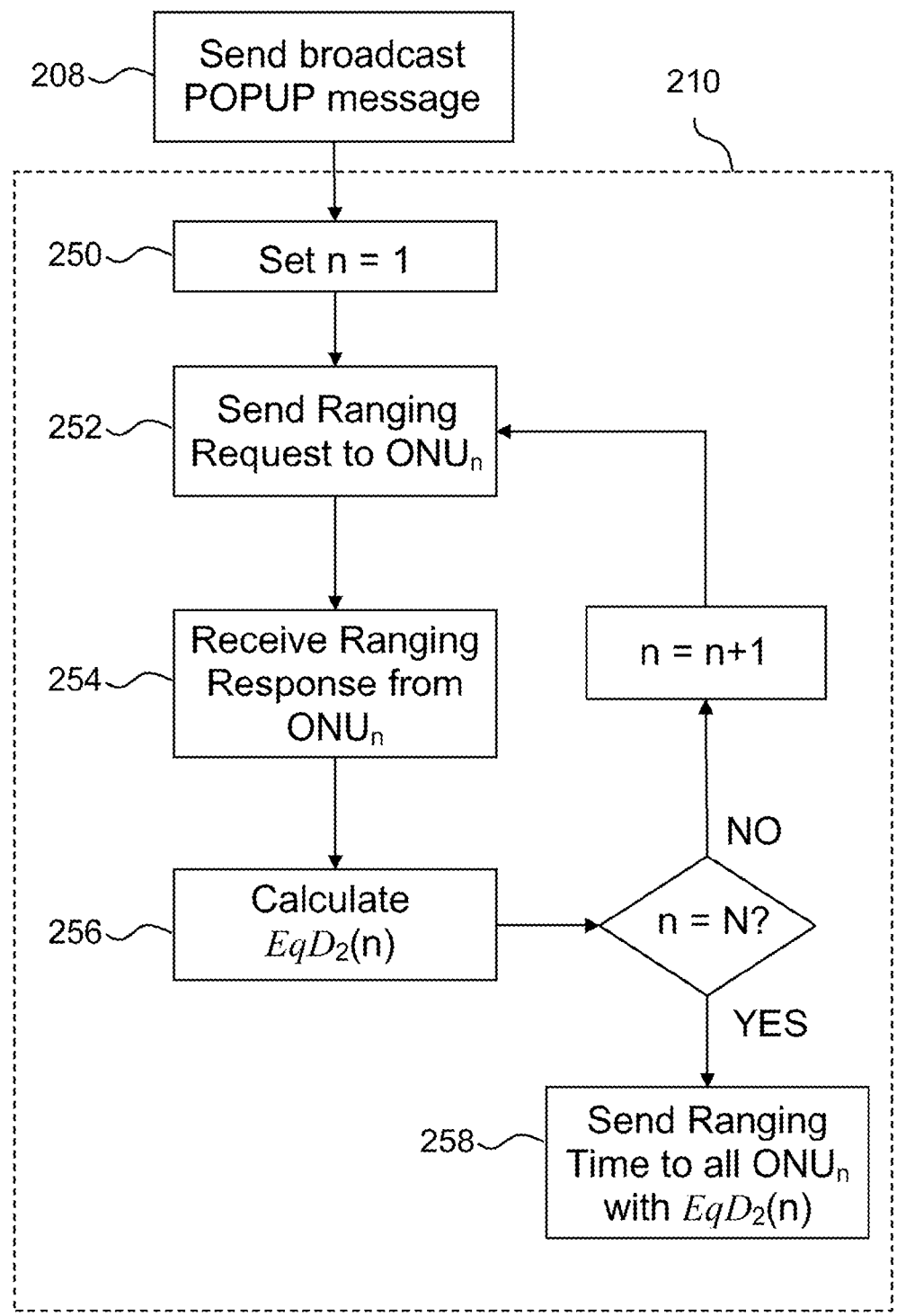

FIG. 9 schematically illustrates a flow diagram of exemplary embodiments of steps 208 and 210 of the method according to the invention, e.g. the methods illustrated in FIGS. 7 and 8. The step 208 of sending a control message to the first optical network device comprises sending a broadcast POPUP message. The broadcast POPUP message is sent from the second optical line termination device via the second optical fiber trunk to all optical network devices ($ONU_1$-$ONU_N$), including the first optical network device and the second optical network device if present, hosted by or connected to the first and second optical line termination devices. In the illustrated embodiment, step 210 of determining and setting timing settings comprises ranging the ONUs one by one and sending a ranging time message to $ONU_n$ for all n=1, ..., N. Step 210 comprises in step 250 and 252 selecting the first optical network device $ONU_1$ and sending a ranging request message to the first optical network device. In step 254, the second optical line termination device 108, 120 receives the ranging response message from the first optical network device thereby measuring the round trip delay $RTD_2$(1) between the first optical network device and the second optical line termination device. After step 254, the equalization delay $EqD_2$(1) for the first optical network device is calculated in step 256.

The steps 252, 254, and 256 are repeated until all round trip delays $RTD_2$(n) and equalization delays $RTD_2$(n) for optical network devices $ONU_n$ (n=1, ..., N) connected to or hosted by the first and second optical line termination device are determined.

In an embodiment of the present invention, the equalization delays $EqD_2$(n) for $ONU_n$ (n=1, 2, ..., N) are given by:

$$EqD_2(n)=EqD_1(n)+\Delta d(n),$$

where $\Delta d(n)$ is the difference between the trunk delay $d_2$ for the second optical fiber trunk and the trunk delay $d_1$ for the first optical fiber trunk:

$$\Delta d(n)=d_2-d_1=RTD_2(n)-RTD_1(n),$$

where $RTD_1$(n) is the round trip delay between $OLT_1$ and $ONU_n$. Values for $EqD_1$(n) and $RTD_1$(n) are retrieved from a memory, e.g. memory 128 in the second optical line termination device 120, 120'.

Then the method proceeds to step 258 of setting the new timing settings, e.g. as illustrated by sending a Ranging Time message. The Ranging Time message may be a broadcast Ranging Time message that is sent to all $ONU_n$ (n=1, ..., N) with a list of equalization delays for each optical network device. Step 258 may comprise sending N Ranging Time messages, one for each optical network device. When the Ranging Time message is received, the optical network devices move back to operation state and communication is again established.

Figure 10:
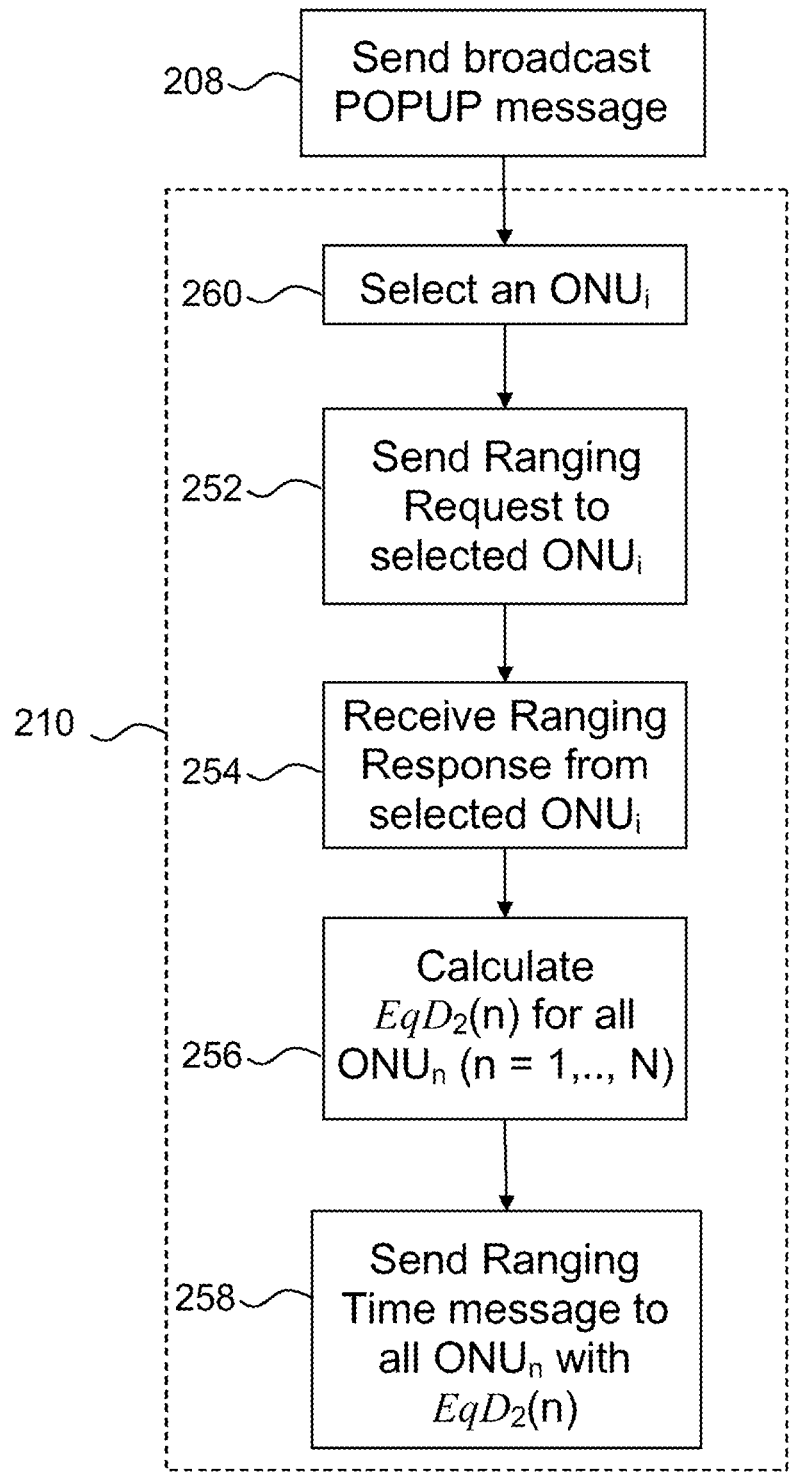

FIG. 10 schematically illustrates a flow diagram of exemplary embodiments of steps 208 and 210 of the method according to the invention, e.g. the methods illustrated in FIGS. 7 and 8. Step 210 comprises step 260 of selecting an optical network device $ONU_i$ among the N optical network devices and step 252 of sending a ranging request message to the selected optical network device $ONU_i$. In step 254, the second optical line termination device, e.g. the second optical line termination device 108, 120, 120', receives the ranging response message from the selected optical network device $ONU_i$ thereby measuring the round trip delay $RTD_2$(i) between the selected optical network device $ONU_i$ and the second optical line termination device. In the embodiment illustrated in FIG. 10, the second optical line termination $OLT_2$ only sends Ranging Request to a selected $ONU_i$ (252) and performs a round trip measurement for the selected $ONU_i$ (254). Then the method proceeds to step 256, where the equalization delays $EqD_2$(n) for all $ONU_n$ (n=1, ..., N) are calculated as $$EqD_2(n)=EqD_1(n)+\Delta d,$$

where $\Delta d$ is the difference between the trunk delay $d_2$ for the second optical fiber trunk and the trunk delay $d_1$ for the first optical fiber trunk and given by:

$$\Delta d=d_2-d_1=RTD_2-RTD_1,$$

where $RTD_2$ is the measured round trip delay for the selected optical network device and $RTD_1$ is the round trip delay between the first optical line termination device and the selected optical network device. Delays apart from $d_2$ and $d_1$ have not changed. $RTD_1$ and/or $EqD_1$(n) may be retrieved from a memory in the second optical line termination device, e.g. memory 128. The new equalization delays $EqD_2$(n) are sent in step 258, which is described in connection with FIG. 9.

It is an advantage of the method partly illustrated in FIG. 10 that the determination of the new equalization delays is performed on the basis of one round trip measurement, thereby saving N-1 round trip measurements.

In an embodiment, the equalization delays $EqD_2$(n) are determined during initial startup of the optical network and stored in a memory, e.g. memory 128. Accordingly, equalization delays $EqD_2$(n) may be retrieved from a memory. Thus in an embodiment of the present invention, steps 252, 254, 256, and 260 may be replaced by the step of retrieving the timing settings, e.g. $EqD_2$(n), from a memory.

The method, device and system according to the invention may be implemented in any Passive Optical Network (PON), in particular in a Gigabit-capable Passive Optical Network (GPON), e.g. as described in G.984.1-3, or in an Ethernet Passive Optical Network (EPON), e.g. as described in IEEE 892.3ah.

It should be noted that in addition to the exemplary embodiments of the invention shown in the accompanying drawings, the invention may be embodied in different forms and should not be construed as limited to the embodiments set forth herein. Rather, the embodiments illustrated herein are provided so that this disclosure will be thorough and complete, and will fully convey the concept of the invention to those skilled in the art.

The invention claimed is:

1. An optical network device for use in an optical network system, said optical network system including a second optical network device, first and second optical line termination devices and an optical distribution network, wherein the optical network device is adapted to communicate with the optical line termination devices via the optical distribution network and an optical fiber trunk, wherein the optical network device comprises a receiver operative to:
   receive a control message from the second optical line termination device such that the optical network device is prevented from moving into an initial state when switching of functionality from the first optical line termination device to the second optical line termination device; and,
   receive, from the second optical line termination device, broadcast timing settings for at least said optical network device and the second optical network device based on only one roundtrip delay measurement, which timing settings are based on measured timing settings for the second optical network device.

2. The optical network device according to claim 1, wherein the receiver is further operative to receive a ranging request message and to send a ranging response message.

3. The optical network device according to claim 1, wherein the receiver is further operative to receive a ranging time message.

4. The optical network device according to claim 1, wherein the timing settings comprise equalization delay settings.

5. A method in an optical network device for an optical network system, said optical network system including a second optical network device, first and second optical line termination devices and an optical distribution network, wherein the optical network device is adapted to communicate with the optical line termination devices via the optical distribution network and an optical fiber trunk, wherein the method comprises:

receiving a control message from the second optical line termination device such that the optical network device is prevented from moving into an initial state when switching of functionality from the first optical line termination device to the second optical line termination device; and, receiving, from the second optical line termination device, broadcast timing settings for at least said optical network device and the second optical network device based on only one roundtrip delay measurement, which timing settings are based on measured timing settings for the second optical network device.

6. The optical network device according to claim 5, wherein the timing settings comprise equalization delay settings.

\* \* \* \* \*